Jan. 12, 1960     E. C. BERTOLET, JR     2,920,656
REINFORCED BELLOWS

Filed Oct. 19, 1956                              2 Sheets-Sheet 1

Jan. 12, 1960  E. C. BERTOLET, JR  2,920,656
REINFORCED BELLOWS
Filed Oct. 19, 1956  2 Sheets-Sheet 2

United States Patent Office 2,920,656
Patented Jan. 12, 1960

2,920,656
REINFORCED BELLOWS

Elmer C. Bertolet, Jr., Haddonfield, N.J., assignor to United States Gasket Company, Camden, N.J., a corporation Application October 19, 1956, Serial No. 616,979

3 Claims. (Cl. 138—49)

This invention relates to the reinforcement of bellows and has for an object the provision of an improved reinforced bellows type unit wherein the bellows is made of corrosion resistant plastic type materials of relatively low stiffness moduli, such as, fluorocarbon-like materials and by reason of its novel reinforcement the unit has an expanded pressure-temperature operating range substantially above such materials.

It has heretofore been proposed to make bellows type expansion joints from plastic materials which are resistant to corrosive atmospheres and which are capable of expanding and contracting. Such plastic bellows by reason of the characteristics of the plastic materials have been useful only over relatively low pressure ranges. The majority of plastic bellows in order to have sufficient flexibility have been made of thermoplastic resins which are of relatively low inherent strength characteristics which decrease rapidly with increase in temperature. Many of such materials are also subject to so-called "plastic flow" and lack the necessary resiliency inherent in elastomeric materials to regain original fabricated dimensions after the stresses have been applied which cause the distortion of the bellows. It is due to these relatively low strength properties that the plastic type bellows have been limited in their application because moderately low pressures and temperatures have caused failure of such bellows units. Heretofore, many attempts have been made to increase the operating pressure range by increasing the wall thickness, overlaying the bellows with such materials as duck and rubber, or asbestos and rubber. Such arrangements have permitted a small increase in the range of operating pressures; however, these prior art arrangements have also required a substantial increase in cost of the bellows due to the extra materials and labor. These "heavy duty" bellows have also resulted in units of much higher spring rate and of limited expansion and contraction.

It is an object of the present invention to increase the pressure-temperature operating ranges of the bellows by providing the unit with reinforcing members located at spaced positions between the convolutions so as not to affect the expansion-contraction operating length of the bellows nor the "spring rate" of the unit.

More specifically, and in accordance with one aspect of the invention there is provided a bellows of fluorocarbon-like material having a stiffness and thickness which produces a tendency for the bellows radially to distort from its normal axial alignment with rise of internal pressure, and means for increasing the resistance to radial movement of the weaker convolutions of the bellows which give rise to the distortion comprising washer-like supporting members interposed between the convolutions of the bellows for progressive engagement from their inner diameter toward their outer diameter by said convolutions moving in a radial direction to produce gradual increasing resistance to distortion of the bellows with increase of internal pressure.

For a more detailed description of the invention and for further objects and advantages thereof, reference is to be had to the following description taken in conjunction with the accompanying drawings in which.

Multi-convolution bellows when subjected to internal pressure start to fail prematurely due to distortion of the walls. As soon as pressure is applied to the internal surfaces the walls of the convolutions tend to become spherical surfaces to better withstand the pressure as indicated by the walls of the convolutions of the bellows 10 in Fig. 2. The walls tend to stretch and as the pressure is increased greater stresses are developed within the unit, and the above tendencies are magnified. By reason of slight differences in physical properties of the bellows material, differences in actual fabricating dimensions between the convolutions, misalignment in installation, and other factors tending to unbalance the stresses within the unit there results a condition where the stresses are concentrated in localized areas of the bellows. With increased localized stresses actual straining of the material occurs which rapidly builds up to the yield point of the material after which failure of the bellows is soon reached.

Heretofore the pressure at which permanent distortion took place was considered the top operating limit to which a bellows could safely be used even though the ultimate strength of the distorted bellows was somewhat higher. The top pressure limit for bellows made from plastic materials is greatly reduced as temperatures are increased. In accordance with the present invention reinforcement provisions are made which greatly reduce the tendency toward premature failure through reduction of the tendency to buckling or distorting of the bellows. The present arrangement tends to reinforce localized areas of high strain by physically restraining the excessive expansion of those areas, thus allowing the ultimate tensile properties of the material to be more fully utilized.

Figure 1:
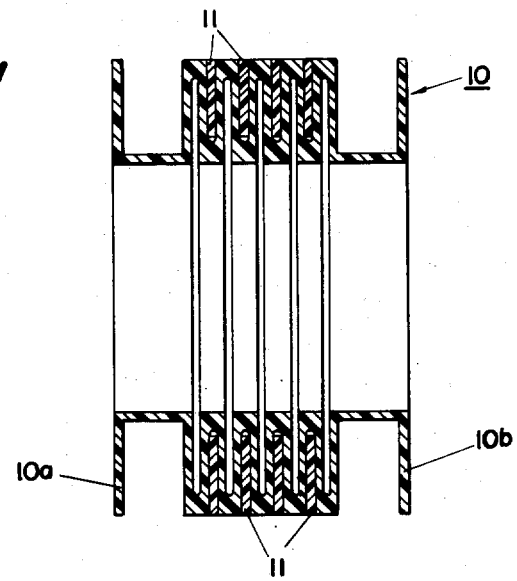
Fig. 1 is a sectional view of a bellows embodying the present invention.

As may be seen in Fig. 1 this is accomplished by the insertion of relatively stiff and substantially flat annular members 11 within the external grooves in the multi-convolution bellows 10. The interleaving of these members 11 results in a more stable structure which balances the pressure forces between convolutions hydraulically through affording mutual support to each successive convolution. The reinforcing members 11 do not restrict the usable axial movement of the bellows 10 as the bellows 10 is designed to take movement in expansion from a predetermined fabricated length, such for example as the overall dimension between the outer surfaces of the end flanges 10a and 10b.

The multi-convolution bellows 10 in Fig. 1 has been illustrated as one having five convolutions. It is of course understood that the present invention is applicable to bellows having either more or less convolutions. The bellows 10 in order to withstand corrosive atmospheres and also to have sufficient flexibility is made from a plastic or fluorocarbon-like material, such for example as polytetrafluoroethylene or polychlorotrifluoroethylene. For applications where corrosion and temperature are less severe the bellows may be made from other suitable plastic materials such as, polyethylene, polyamides and the like. The inner and outer grooves in the bellows walls may be formed by machining. The outer grooves which separate the convolutions from each other are suficiently wide to receive the reinforcing members 11 when the joint is in its original unexpanded position as shown in Fig. 1.

Figure 2:
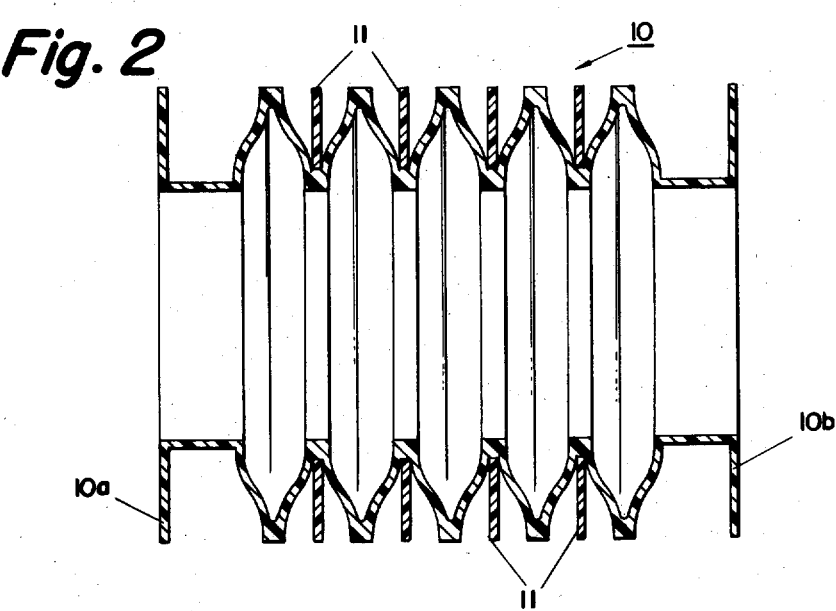
Fig. 2 is a sectional view similar to Fig. 1 with the bellows in expanded position.

As may be seen in Fig. 1, the outer diameter of the annular reinforcing rings 11 is substantially the same as the outer diameter of the bellows 10. The inner diameter of the rings 11 is slightly greater than the diameter at the inner end of the grooves between the convolutions of the bellows. With this arrangement the bellows may move to its expanded position within its normal working limit as shown in Fig. 2 and the reinforcing members 11 do not affect the expansion-contraction operating length of the unit nor do they affect the "spring rate" of the unit.

The interleaving annular reinforcing members 11 which are preferred are made from material having a relatively high stiffness and rigidity. This raises the maximum operating pressures for the bellows as it reduces the tendency for buckling due to the physical interferences between convolutions as well as resistance towards deflection. Thus while flexible reinforcing members such as rubber rings provide a reinforced unit with increased pressure rating due to the support afforded between adjacent convolutions the preferred embodiment employs ring members of substantially rigid materials such for example as reinforced plastic laminates or the like. A filler or fibrous reinforcing material such as cotton or glass fibre impregnated with low pressure or contact type bonding mediums such as, epoxy resins, polyesters, cellulose esters, rubber cements or the like may be molded in situ to form hard, unyielding, flat, washer-like rings. With these rings in place and loosely mounted between the convolutions the following results are achieved by reason of their inclusion in the plastic bellows. As the bellows expands the opposed surfaces or sides of the adjacent convolutions are pressed against the interposed rings 11, compressing the rings 11 axially therebetween, which rings serve two purposes. One, they provide additional strength to the walls of the bellows 10 but more importantly as the radial distortion occurs the surface area engaging the rings gradually increases and thus increases the resistance to movement of the bellows in a radial direction since a sliding action invariably takes place during such radial movement. Thus the rings provide a means operative upon occurrence of radial distortion to increase the strength of the bellows in the regions of the bellows of less strength which give rise to the radial distortion.

Figure 3:
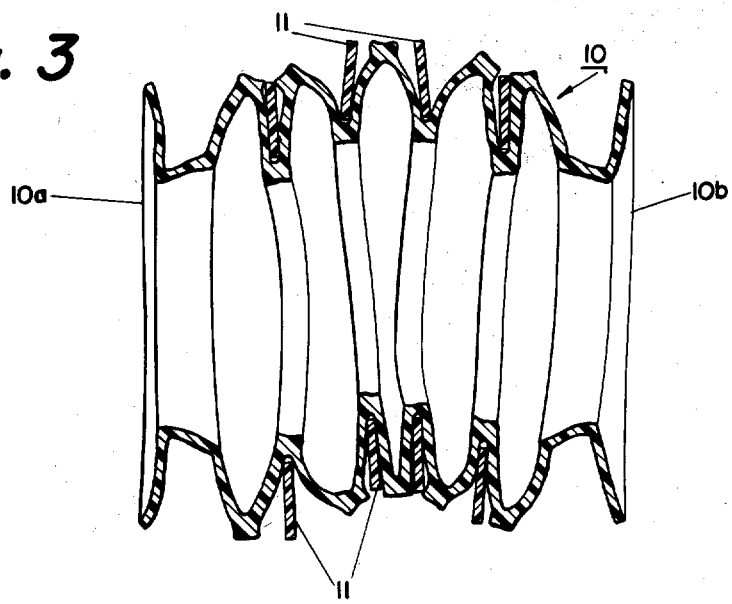
Fig. 3 is a sectional view similar to Fig. 2 but with the bellows in buckled position after subjection to abnormally high internal pressure.
Figure 4:
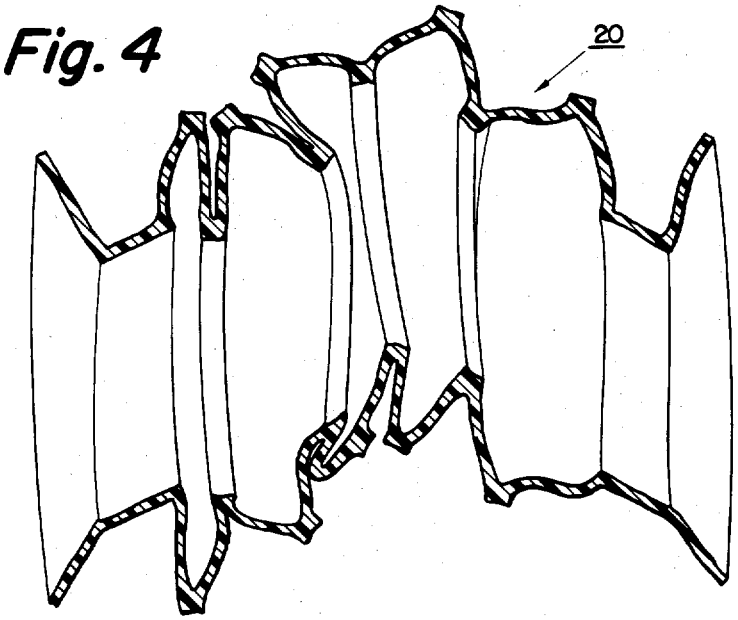
Fig. 4 is a sectional view of a bellows in buckled position after subjection to abnormally high internal pressure and without the reinforcing spacer members.

When an unsupported bellows 20 is subjected to an abnormally high internal pressure it will buckle and the convolutions will tend to turn inside out as shown in Fig. 4. When the bellows is supported with the reinforcing members in accordance with the present invention, Fig. 3, the same bellows may be subjected to substantially higher pressures before buckling occurs. In fact, experience has shown that the buckling pressure may be raised to a value corresponding substantially to the rupture pressure of the unit when the bellows is reinforced in accordance with the present invention.

The following table is exemplary of data derived from comparing unreinforced bellows made of polytetrafluoroethylene with the novel reinforced polytetrafluoroethylene bellows.

| Unit | Size | Number Convolutions | Nom. Wall, inches | Temp., °F. | Buckling Pressure, p.s.i. | Rupture Failure, p.s.i. |
| --- | --- | --- | --- | --- | --- | --- |
| 1 | 2" I.P.S | 5 | 1/16 | 75 | 100–150 | 270 |
| 2 | 2" I.P.S | 5 | 1/16 | 75 | 300 | >300 |
| 3 | 2" I.P.S | 5 | 1/16 | 200 | 65 | 100 |
| 4 | 2" I.P.S | 5 | 1/16 | 200 | 240 | >270 |
| 5 | 4" I.P.S | 5 | 1/16 | 300 | 0–1 | 32 |
| 6 | 4" I.P.S | 5 | 1/16 | 300 | 50 | 90 |

Units 1, 3 and 5 were the non-reinforced bellows and the test results showed that at a temperature of 75° F. the bellows buckled at a pressure between 100 and 150 pounds per square inch although the unit did not rupture until about 270 pounds per square inch. A similar bellows under the same temperature conditions when reinforced in the manner taught by the present invention did not buckle until it reached a pressure of 300 pounds per square inch nor did it rupture. This is indicated by unit number 2 in the table. Unit number 3 in the table shows that when the unreinforced polytetrafluoroethylene bellows was subjected to a temperature of 200° F. it withstood a buckling pressure of only 65 p.s.i. and its rupture pressure was reduced to 100 p.s.i. As indicated by unit 4 a similar bellows when reinforced with the reinforcing rings of the present invention was able to withstand a buckling pressure of 240 p.s.i. at 200° F. and did not rupture until about 270 p.s.i. The reinforcing rings employed in Examples 2 and 4 above were made of resin reinforced with cotton cord.

Units 5 and 6 were 4 inch I.P.S. (iron pipe size) and when subjected to a temperature of 300° F. the reinforced unit 6 withstood a buckling pressure about fifty times greater than the non-reinforced bellows and did not rupture until about 90 p.s.i. The reinforcing rings on unit 6 were polyester reinforced with glass fibre.

While the annular reinforcing rings of the foregoing type are preferred they may be made of other suitable materials. For example the rings may be molded or die cut elastomeric materials which may be stretched and snapped into place. Reinforced elastomeric rings may be used which may be split and recemented into position between the convolutions. Metallic rings which can be split and assembled into position with subsequent bonding by appropriate means may be used to provide continuous reinforcing rings. As pointed out the reinforced plastic rings molded in situ are preferred for most applications as they eliminate assembly problems by being formed in place between the convolutions and they also have the desirable characteristic of having high stiffness or rigidity. The resin rings also are desirable since they can be made corrosion resistant and capable of operating at relatively high temperatures as well as being relatively inexpensive.

While a preferred embodiment of this invention has been illustrated it is to be understood that other modifications may be made within the scope of the appended claims.

What is claimed is:

1. A bellows of fluorocarbon-like material having a predetermined expansion-contraction operating length and spring rate, said material having a stiffness and thickness which produces a tendency for the bellows radially to distort from its normal axial alignment with rise of internal pressure, said bellows having multi-convolutions preformed therein with external grooves between adjacent convolutions, and means for increasing the resistance to radial movement of said convolutions of said bellows which give rise to said distortion comprising individual washer-like supporting members interposed in said external grooves between said convolutions of said bellows, said washer-like supporting members being of substantial radial dimension between the inner and outer diameters thereof for engagement with the sides of said adjacent convolutions, the outer diameter of said washer-like supporting members being substantially the same as the outer diameter of said convolutions of said bellows, the inner diameter of said washer-like supporting members being slightly greater than the diameter at the inner end of the grooves between said convolutions of said bellows so that said bellows is movable to expanded position within its normal working limit with said expansion-contraction operating length and said spring rate being unaffected by said washer-like supporting members, said washer-like supporting members being constructed and adapted for progressive engagement from their inner diameter toward their outer diameter by the sides of said convolutions moving in a radial direction to place said washer-like supporting members under compression in an axial direction and produce gradual increasing resistance to distortion of said bellows from said normal axial alignment with increase of internal pressure.

2. A bellows according to claim 1 wherein said washer-like supporting members comprise continuous rings.

3. A bellows of plastic material resistant to corrosive atmosphere and having a predetermined expansion-contraction operating length and spring rate, said plastic material having a stiffness and thickness which produces a tendency for the bellows radially to distort from its normal axial alignment with rise of internal pressure, said bellows having preformed therein a plurality of convolutions with external grooves between adjacent convolutions, and means for increasing the resistance to radial movement of said convolutions of said bellows which give rise to said distortion comprising individual washer-like supporting members interposed in said external grooves between said convolutions of said bellows, said washer-like supporting members being loosely mounted between said convolutions of said bellows when the latter is in unexpanded position in avoidance of affecting said expansion-contraction operating length and said spring rate of said bellows, said washer-like supporting members having a substantially flat annular shape and being of substantial radial dimension between the inner and outer diameters thereof for progressive engagement from their inner diameter towards their outer diameter by the sides of said convolutions moving in a radial direction to place said washer-like supporting members under compression in an axial direction and produce gradual increasing resistance to distortion of said bellows from said normal axial alignment with increase of internal pressure.

References Cited in the file of this patent
UNITED STATES PATENTS

| | | |
|---|---|---|
| 581,343 | Frank | Apr. 27, 1897 |
| 1,179,577 | Sundh | Apr. 18, 1916 |
| 1,905,583 | Giesler | Apr. 25, 1933 |
| 2,644,487 | Schindler | July 7, 1953 |
| 2,728,356 | Brinsmade et al. | Dec. 27, 1955 |
| 2,755,643 | Wildhaber | July 24, 1956 |